United States Patent [19]

Kadono et al.

[11] Patent Number: 5,139,899

[45] Date of Patent: Aug. 18, 1992

[54] LITHIUM ION CONDUCTIVE GLASS ELECTROLYTE

[75] Inventors: Kohei Kadono; Masaru Yamashita; Kenichi Kinugawa, all of Ikeda; Hiroshi Tanaka, Kawanishi, all of Japan

[73] Assignee: Agency of Industrial Science and Technology, Tokyo, Japan

[21] Appl. No.: 654,109

[22] Filed: Feb. 12, 1991

[30] Foreign Application Priority Data

Mar. 19, 1990 [JP] Japan .................................. 2-68582

[51] Int. Cl.$^5$ .............................................. H01M 6/18
[52] U.S. Cl. .................................... 429/191; 429/199; 204/68; 204/421
[58] Field of Search .................. 204/68, 421; 429/191, 429/199

[56] References Cited

U.S. PATENT DOCUMENTS

| | | | |
|---|---|---|---|
| 3,607,404 | 9/1971 | Buzzelli | 429/199 |
| 3,837,920 | 9/1974 | Liang et al. | 429/191 |
| 4,156,635 | 5/1979 | Cooper et al. | 204/68 |
| 4,184,018 | 1/1980 | Fletcher et al. | 429/199 |
| 4,186,248 | 1/1980 | Mellors | 429/191 |
| 4,352,869 | 10/1982 | Mellors | 429/191 |
| 4,434,216 | 2/1984 | Joshi et al. | 429/191 |
| 4,816,356 | 3/1989 | Balkanski | 429/191 |
| 4,849,072 | 7/1989 | Bowman | 204/68 |

Primary Examiner—John Niebling
Assistant Examiner—Arun S. Phasge
Attorney, Agent, or Firm—Armstrong & Kubovcik

[57] ABSTRACT

The present invention discloses a lithium ion conductive glass electrolyte including a cationic component and an anionic component, the cationic component including (A) a lithium ion, (B) alkaline earth metal ions and (C) alkali metal ions other than lithium in a percentage composition falling within a region enclosed by the straight lines formed by connecting, in an ionic ratio diagram, points of A(60, 10, 30), B(70, 0, 30), C(40, 0, 60) and D(40, 10, 50) in order, the anionic component being at least one halide ion selected from among chloride, bromide and iodide ions.

4 Claims, 2 Drawing Sheets

LITHIUM ION CONDUCTIVE GLASS ELECTROLYTE

BACKGROUND OF THE INVENTION

The present invention relates to the material of a novel lithium ion conductive glass electrolyte useful as the material of electrolyte for a lithium cell.

The utilization of a solid material of electrolyte instead of a liquid material of electrolyte for a cell serves to eliminate problems of a cell wherein use is made of a liquid material of electrolyte, such as damage due to liquid leakage and leaching of an electrode material, and further brings about many additional advantages including easy attainment of thin film formation and a reduction in the size.

Known such cells include a lithium cell wherein the material of a lithium ion conductive solid electrolyte is used and a lithium metal is used as a negative electrode active material.

The material of a lithium ion conductive solid electrolyte is broadly classified into an organic polymer, an inorganic crystal and an inorganic glass.

Among them, the organic polymer has excellent moldability and can easily be formed into a thin film but has drawbacks such as poor mechanical strengths and thermal stability.

Although the inorganic crystal has excellent thermal stability and can be used at a high temperature, the polycrystalline nature thereof brings about drawbacks such as a lowering in the conductivity due to IR drop in the grain boundary, poor moldability and difficulty of thin film formation.

On the other hand, the inorganic glass has advantages such as excellent moldability, possibility of thin film formation and freedom from IR drop in the grain boundary. Therefore, if a material having a high ionic conductivity could be found, there is a high possibility that the inorganic glass can be applied to a lithium cell. However, in order to attain a high conductivity, it is necessary to incorporate a large amount of lithium ions in the glass. An increase in the lithium ion content makes it difficult to be vitrified. This unfavorably makes it necessary to rapidly quench a melt by means of a twin roller for vitrification.

For this reason, no material of a lithium ion conductive solid electrolyte which can be put to practical use has hitherto been developed.

Accordingly, the present inventors have paid attention to an inorganic glass among the materials of a lithium ion conductive solid electrolyte and made studies with a view to solving the above-described problems while enjoying the above-described advantages and, as a result, have found that a composition comprising a lithium halide as a major component and, incorporated therein in the form of a halide, alkaline earth metal ions and alkali metal ions other than lithium each in a predetermined proportion can be vitrified without the necessity for remarkable quenching and the resultant glass has an excellent lithium ion conductivity, which has led to the completion of the present invention.

SUMMARY OF THE INVENTION

An object of the present invention is to provide a novel lithium ion conductive glass electrolyte which can easily be prepared because of the nonnecessity for rapid quenching in the vitrification, can easily formed into a thin film by virtue of its excellent moldability, and has a high ionic conductivity.

The above-described object of the present invention can be attained with the use of a lithium ion conductive glass electrolyte comprising a cationic component and an anionic component, said cationic component comprising (A) a lithium ion, (B) alkaline earth metal ions and (C) alkali metal ions other than lithium in a percentage composition falling within a region enclosed by the straight lines formed by connecting, in an ionic ratio diagram, points of A(60, 10, 30), B(70, 0, 30), C(40, 0, 60) and D(40, 10, 50) in order, said anionic component being at least one halide ion selected from among chloride, bromide and iodide ions.

DESCRIPTION OF THE PREFERRED EMBODIMENTS

In the lithium ion conductive glass electrolyte of the present invention, the cationic component comprises (A) a lithium ion, (B) alkaline earth metal ions and (C) alkali metal ions other than lithium.

Figure 1:
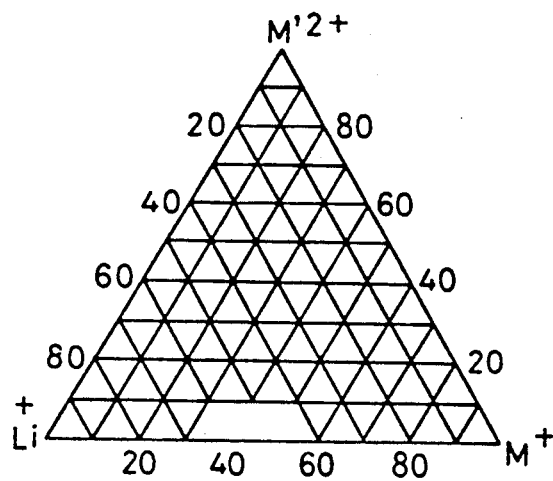
FIG. 1 is an ionic ratio diagram showing an ionic ratio of cations of the components constituting the glass of the present invention.

The proportions of the components (A), (B) and (C) should fall within a region enclosed by the straight lines formed by connecting, in an ionic ratio diagram shown in FIG. 1, points of A(60, 10, 30), B(70, 0, 30), C(40, 0, 60) and D(40, 10, 50) in order. If the percentate composition is outside the above-described range, it is difficult to attain the vitrification. In FIG. 1, $M^+$ represents alkali metal ions and $M'^{2+}$ represents alkaline earth metal ions.

The lithium ion as the component (A) is an indispensable component and is in a range from 40 to 70% in terms of the ionic ratio. Calcium ion, barium ion, etc., are preferred as the component (B) because they facilitate the vitrification.

Potassium ion, cesium ion, rubidium ion, etc., are preferred as the component (C) because they work to improve the stability against the devitrification of the glass.

The anion to be combined with the above-described cations is at least one halide ion selected from among chloride, bromide and iodide ions. When a mixture of two or more of these ions are to be used, it is preferred that any one of the anions amount to 90% or more as a major component based on the total amount of the anions.

The glass electrolyte of the present invention is colorless and transparent and contains a lithium ion as a major component, so that the ionic conductivity reaches $10^{-6}$ S/cm at room temperature. Since the transport number of the lithium ion in this glass is 1, neither electronic conductivity nor ionic conductivity other than that of lithium ion exists.

The lithium ion conductive glass electrolyte of the present invention can be prepared by conventional processes for producing glass. Specifically, predetermined halide starting materials are weighed and mixed with each other so as to have a predetermined composition.

The mixture is melted at 450° to 550° C. through the use of a pot crucible made of quartz glass, platinum, etc. When the mixture is sometimes stirred during melting, the melt can be homogenized in 15 to 30 min. As soon as the melt has become homogeneous, it is poured into a mold made of a metal or the like for cooling, thus causing the melt to be vitrified. The contamination of the compounds which are produced by reactions of the starting materials with moisture or oxygen throughout the process renders the vitrification of the melt difficult. Therefore, the preparation of the glass is preferably conducted in an atmosphere of an inert gas, such as nitrogen or argon, particularly in a glove box. The thickness of the glass thus obtained is usually about 0.05 to 1 mm.

The halide starting materials include a lithium halide as a supply source of the component (A), such as lithium chloride, lithium bromide or lithium iodide, at least one alkaline earth metal halide represented by the formula $M'X'_2$ (wherein $M'$ is an alkaline earth metal, preferably calcium or barium, and $X'$ is chlorine, bromine or iodine) as a supply source of the component (B), and at least one alkali metal halide represented by the formula MX (wherein M is an alkali metal other than lithium, preferably potassium, cesium or rubidium, and X is chlorine, bromine or iodine) as a supply source of the component (C).

As described above, the lithium ion conductive glass electrolyte of the present invention can easily be prepared because of the nonnecessity for rapid quenching in the vitrification, can easily be formed into a thin film by virtue of its excellent moldability, and has a high ionic conductivity, for example, a lithium ion conductivity of $10^{-9}$ to $10^{-6}$ S/cm at room temperature.

Therefore, the lithium ion conductive glass electrolyte of the present invention can be utilized e.g., as a solid electrolyte for a lithium cell.

The present invention will now be described in more detail by way of the following Examples.

Example 1

0.98 g of LiCl, 1.01 g of KCl, 0.57 g of CsCl and 0.44 g of $BaCl_2$ were weighed and melt-mixed with each other at 550° C. for 15 min in a quartz glass crucible. The resultant melt was cast on a metallic plate and pressed by another metallic plate, thereby preparing a colorless and transparent glass sample in a disk form having a diameter of 30 mm and a thickness of 0.5 mm. All the above-described procedures were conducted in a glove box in a nitrogen atmosphere. The sample thus prepared was subjected to differential scanning calorimetry, and the results are shown in FIG. 2.

Figure 2:
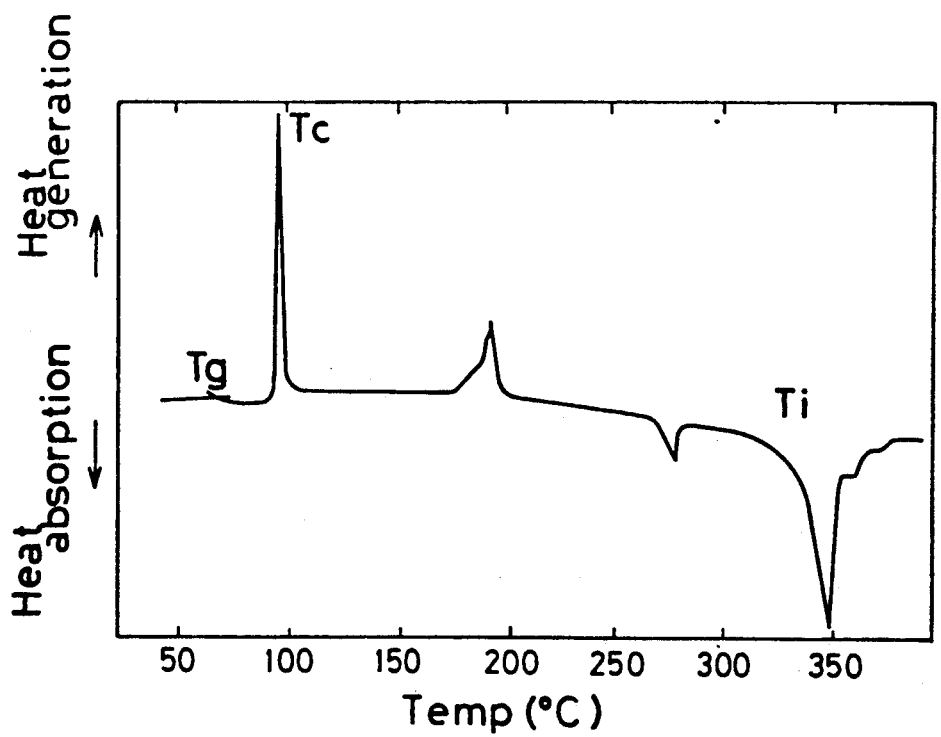
FIG. 2 is a graph showing the results of a differential scanning calorimetry in Example 1.

As is apparent from FIG. 2, glass transition, heat generation due to crystallization and an endothermic peak are clearly observed, thus proving that the sample is glassy. The glass composition, glass transition temperature (Tg) and crystallization temperature (Tc) of the sample are shown in Table 1.

Both the surfaces of the glass sample in a disk form was coated with a silver paste to give an electrode and the conductivity of the electrode was determined by the alternating current impedance method. The results are shown in Table 3. As is apparent from FIG. 3, the lithium ion conductivity was $5.3 \times 10^{-9}$ S/cm at 25° C.

Examples 2 to 5

Figure 3:
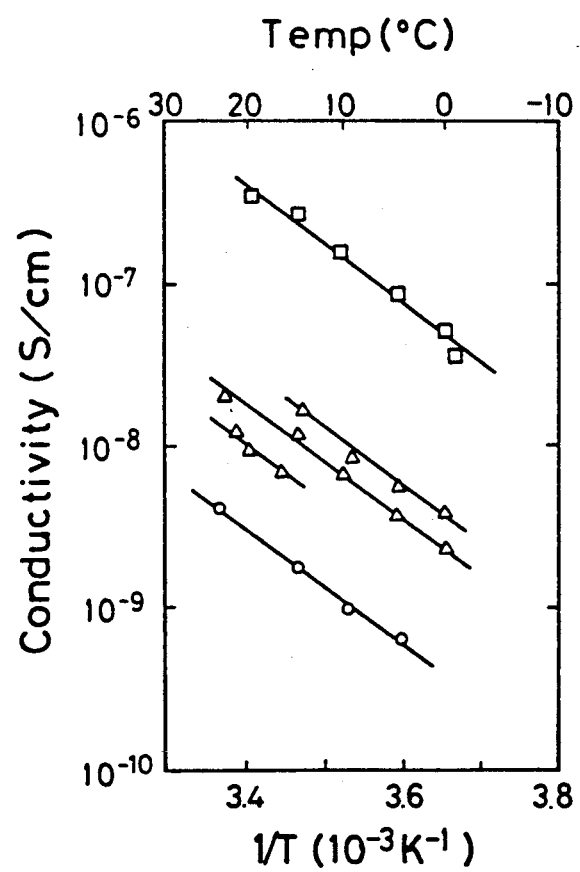
FIG. 3 is a graph showing the dependency of the ionic conductivity of the glass of the present invention upon temperature.

Glass samples were prepared in the same manner as that of Example 1, except that the composition was changed, to determine the Tg and Tc of each of the samples. Further, the conductivity was determined in the same manner as that of Example 1. The results are shown in FIG. 3, and the determined values are shown in Table 1.

TABLE 1

| | Composition (mol. %) | Tg (°C.) | Tc (°C.) | log σ (S/cm) (25° C.) |
|---|---|---|---|---|
| Ex. 1 | LiCl(55) + KCl(32) + CsCl(8) + $BaCl_2$(5) | 61 | 90 | −8.3 |
| Ex. 2 | LiBr(55) + KBr(20) + CsBr(20) + $BaBr_2$(3.5) + $CaBr_2$(1.5) | 57 | 79 | −7.6 |
| Ex. 3 | LiI(55) + KI(8) + CsI(32) + $BaCl_2$(5) | 40 | 68 | −6.2 |
| Ex. 4 | LiBr(55) + KBr(20) + CsBr(20) + $BaCl_2$(3.5) + $CaCl_2$(1.5) | 55 | 82 | −7.8 |
| Ex. 5 | LiBr(55) + KBr(20) + CsBr(20) + $BaCl_2$(3.5) $CaCl_2$(1.5) | 49 | 82 | −7.4 |

What is claimed is:

1. A lithium ion conductive glass electrolyte comprising a cationic component and an anionic component, said cationic component comprising (A) a lithium ion, (B) alkaline earth metal ions and (C) alkali metal ions other than lithium in a percentage composition falling within a region enclosed by the straight lines formed by connecting, in an ionic ratio diagram, points of A(60, 10, 30), B(70, 0, 30), C(40, 0, 60) and D(40, 10, 50) in order, said anionic component being at least one halide ion selected from among chloride, bromide and iodide ions.

2. An electrolyte according to claim 1, wherein said alkaline earth metal ions as the component (B) are ions selected from the group consisting of calcium and barium ions.

3. An electrolyte according to claim 1, wherein said alkali metal ions other than lithium as the component (C) are ions selected from the group consisting of potassium, cesium and rubidium ions.

4. An electrolyte according to claim 1, wherein said anion is a mixture of a plurality of halide ions and any one of the halide ions in the mixture amounts to 90% or more based on the total amount of the anions.

* * * * *